UNITED STATES PATENT OFFICE.

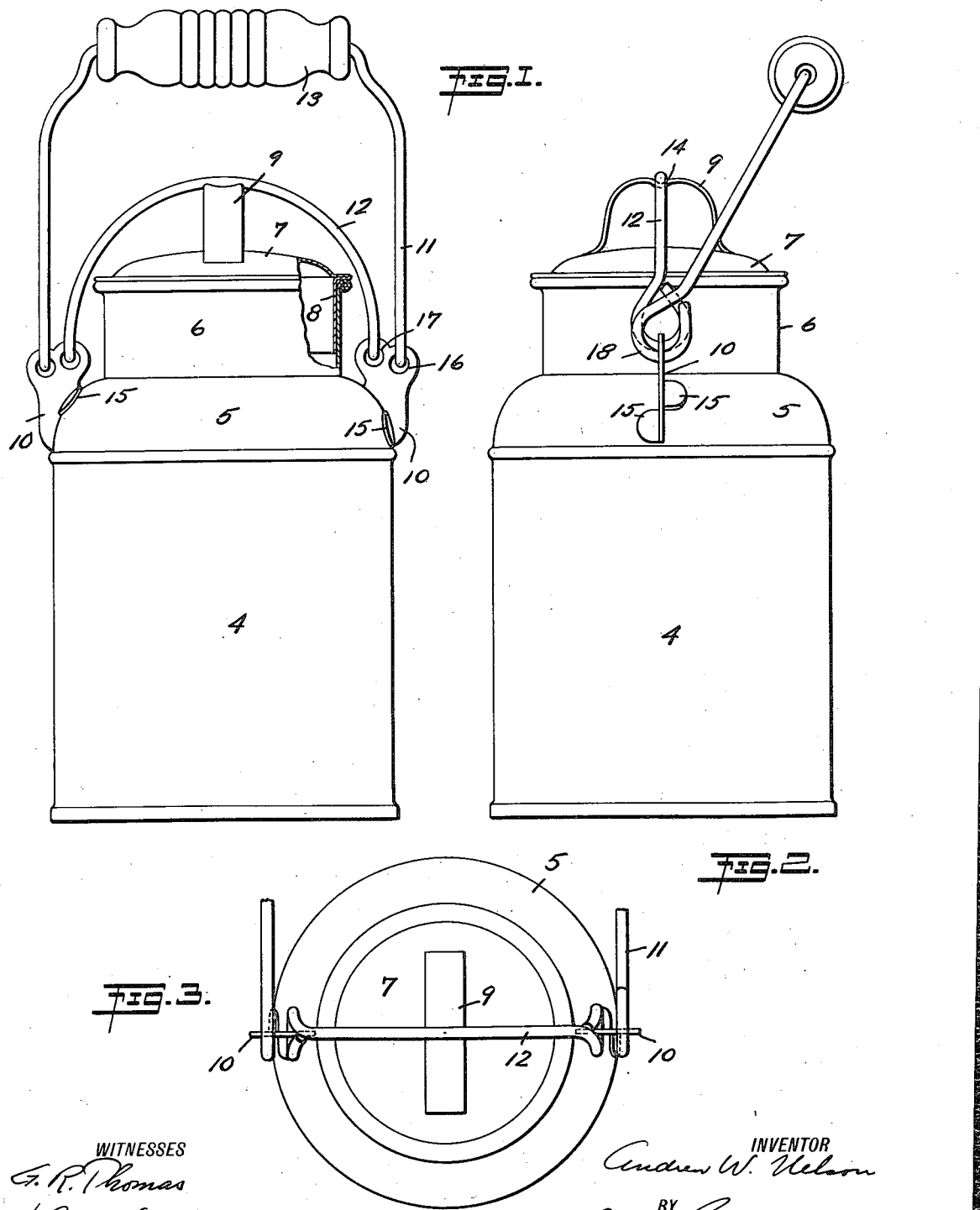

ANDREW W. NELSON, OF TERRE HAUTE, INDIANA, ASSIGNOR TO COLUMBIAN ENAMELING & STAMPING COMPANY, OF TERRE HAUTE, INDIANA, A CORPORATION OF INDIANA.

COVERED KETTLE.

1,173,730.  Specification of Letters Patent.  Patented Feb. 29, 1916.

Application filed February 25, 1915. Serial No. 10,452.

*To all whom it may concern:*

Be it known that I, ANDREW W. NELSON, a citizen of the United States, and a resident of Terre Haute, in the county of Vigo and State of Indiana, have invented certain new and useful Improvements in Covered Kettles, of which the following is a specification.

This invention is a covered kettle or pail, and comprises a certain combination of the body and cover thereof with carrying and locking bails and common lugs with which they engage, whereby the kettle is provided cheaply and advantageously with means for securely holding its cover in closed position.

In the accompanying drawings forming part hereof: Figure 1 is an elevation of the kettle with a portion broken away and in vertical section; Fig. 2 is an elevation looking at right angles to Fig. 1; and Fig. 3 is a plan view with the carrying bail broken away.

The cylindrical body 4 of the kettle has a shouldered portion 5 joining with a neck or mouth 6, and is closed by a slip cover 7 having a wide depending flange 8 to enter the neck and provided on top with an arched handle 9 for inserting and removing it.

A pair of lugs or ears 10 are secured at diametrically opposite points on the shouldered portion 5 to receive both a carrying bail 11 and a locking bail 12, the carrying bail being provided with the customary grip 13 and the locking bail being adapted to be forced over the arch of the handle 9 and to spring into a central depression 14 with which this cover is provided. Each of the lugs 10 is formed of a flat, sufficiently strong piece of metal rising upward from the shouldered portion 5 and disposed radially with respect to the body of the receptacle, the base of the lug being curved to conform to the curvature of the shoulder, and having oppositely bent attaching lugs 15 which are united by welding or otherwise to the metal of the body.

Each lug, furthermore, is double, having two eyes 16 and 17, the eyes 17 forming an inner pair and the eyes 16 an outer pair. The outer pair of eyes are engaged by the ends of the carrying bail 11, which ends are looped as shown at 18 in Fig. 2 for the purpose of hinging or linking them to the eyes. The approximately semicircular locking bail 12 is in like manner connected with the inner eyes 17. By this construction both of the bails are centralized, and are so arranged that neither interferes with the other. Strength and convenience are secured, and the additional expense of labor and materials over ordinary non-locking constructions is extremely slight. The operation of the locking bail will be obvious.

While I have thus described the preferred embodiment of my device in detail, it will be understood that I do not limit myself to the precise form shown and that various changes may be made within the scope of the invention.

What I claim as new is:

1. In a covered kettle, a body and a cover, in combination with lugs on the body disposed radially and each having two eyes, a bail for locking the cover having its ends linked with the inner pair of eyes, and a carrying bail having its ends linked with the outer pair of eyes, whereby the carrying bail may swing without interference with the locking bail.

2. A covered kettle comprising a cylindrical body formed with a shouldered portion joining to a neck or mouth, a slip cover insertible in said neck and having an arched handle fixed thereto and provided with a central depression, upstanding lugs on said shouldered portion disposed radially and each having two eyes, a locking bail having its ends linked with the inner pair of eyes to coöperate with said depression, and a carrying bail having its ends linked with the outer pair of eyes, whereby the carrying bail may swing without interference with the locking bail.

In testimony whereof I have signed my name hereto in the presence of two subscribing witnesses.

ANDREW W. NELSON.

Witnesses:
WILBUR TOPPING,
J. L. DEERE.